United States Patent
Weber et al.

[11] Patent Number: 5,278,469
[45] Date of Patent: Jan. 11, 1994

[54] ENDSHIELD COVER ASSEMBLY FOR A MOTOR

[75] Inventors: Bruce Weber, House Springs, Mo.; Gerald G. Kloster, Sturgeon Bay, Wis.

[73] Assignee: Emerson Electric Co., St. Louis, Mo.

[21] Appl. No.: 990,751

[22] Filed: Dec. 15, 1992

[51] Int. Cl.⁵ ............................................ H02K 5/00
[52] U.S. Cl. ...................................... 310/89; 310/42; 310/68 R; 310/91
[58] Field of Search ............... 310/85, 89, 91, 42, 310/68

[56] References Cited

U.S. PATENT DOCUMENTS

| | | | |
|---|---|---|---|
| 1,999,308 | 4/1935 | Steiner | 310/89 UX |
| 3,873,861 | 3/1975 | Halm | 310/42 |
| 4,673,838 | 6/1987 | Tagaki | 310/89 |
| 4,767,956 | 8/1988 | Cimato | 310/91 |
| 4,853,303 | 8/1989 | Fisher | 310/42 |
| 5,130,587 | 7/1992 | Janisse | 310/89 |

FOREIGN PATENT DOCUMENTS 0167643  8/1985  Japan ................. 310/91

Primary Examiner—R. Skudy
Attorney, Agent, or Firm—Polster, Lieder, Woodruff & Lucchesi

[57] ABSTRACT

An endshield/endshield cover assembly for an electric motor includes and endshield having a base, a circumferential wall extending upwardly from the base, and a protrusion extending outwardly from the base wall. The endshield cover has a circumferential wall extending downwardly from a top. The cover wall defines a hole which is sized and shaped to fit over the projection. By aligning the endshield cover hole with the endshield projection, the endshield cover may be pivoted into place and secured with only one screw.

14 Claims, 1 Drawing Sheet

ENDSHIELD COVER ASSEMBLY FOR A MOTOR

BACKGROUND OF THE INVENTION

This invention relates to dynamoelectric machines in the form of electrical motors, and, in particular to a cover for a motor endshield.

A motor conventionally includes a static assembly and a rotor assembly. The static assembly includes a motor winding and the rotor assembly includes a rotor and a shaft. The rotor and static assemblies commonly are encased in a cylindrical housing which is closed at its top and bottom by endshields. Control circuitry is generally associated with the motor and is secured in some fashion to one endshield. The control circuitry commonly is protected from the ambient environment by an endshield cover.

The endshield cover is generally connected to the endshield by a pair of screws. To service the control circuit, or the motor, the endshield cover must be removed. However, when the motor is mounted in the field, one of the screws, which secures the cover to the endshield, is often inaccessible, making removal of the cover difficult. When this happens, the entire motor must be removed from its installation. If the second screw were accessible, removal of the motor would be unnecessary. The inaccessibility of the second screw and the inability to easily remove the endshield cover only makes field service of the motor more difficult, time consuming and expensive.

SUMMARY OF THE INVENTION

One object of this invention is to provide an endshield cover for a motor.

Another object is to provide such a cover which may be quickly and easily removed to service the motor.

Another object is to provide such an endshield cover endshield assembly which is easy and economical to produce.

These and other objects will become apparent to those skilled in the art in light of the following disclosure and accompanying drawings.

Generally stated, there is provided a motor assembly which includes a shell housing a motor assembly, the shell being closed on either end by a first and a second endshield. A control circuit which controls the motor is mounted on the first endshield. An endshield cover is removably mounted on the first endshield to enclose the control circuit. The first endshield has a base, a circumferential wall extending upwardly from the base, and a protrusion extending radially outwardly from its wall. The endshield cover is sized to fit over the endshield and has a top and a circumferential wall extending downwardly from its top. The endshield cover wall defines an opening at its bottom which is sized and shaped to fit over the endshield wall protrusion. The endshield cover is secured to the endshield by a single fastener, preferably a screw, which extends through a screw hole in the cover into a screw hole in the endshield wall. Preferably, the screw is positioned at a point opposite the endshield wall projection. The endshield wall defines an external shoulder upon which the cover sits.

DESCRIPTION OF THE PREFERRED EMBODIMENT

Figure 1:
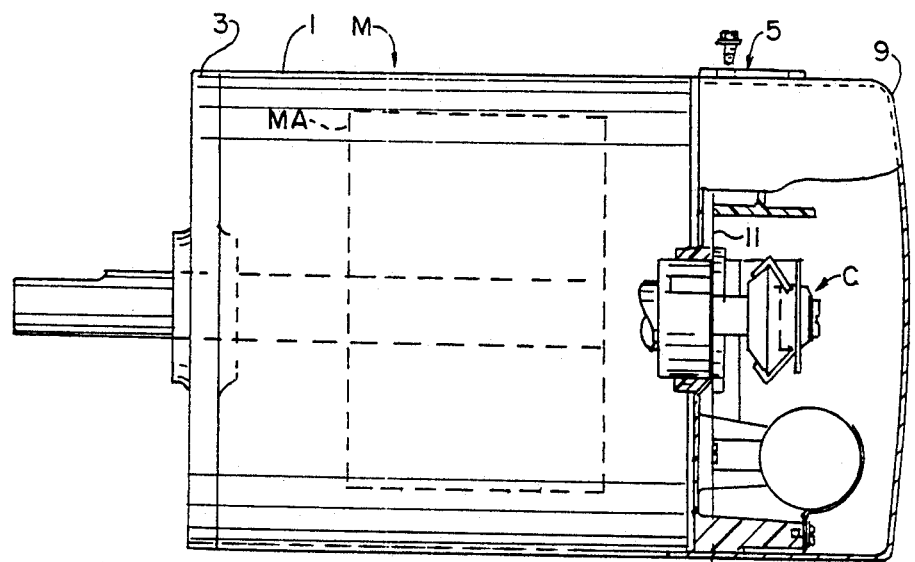
FIG. 1 is a side elevational view of a motor assembly, partly broken away, a winding of the motor being shown in phantom.
Figure 2:
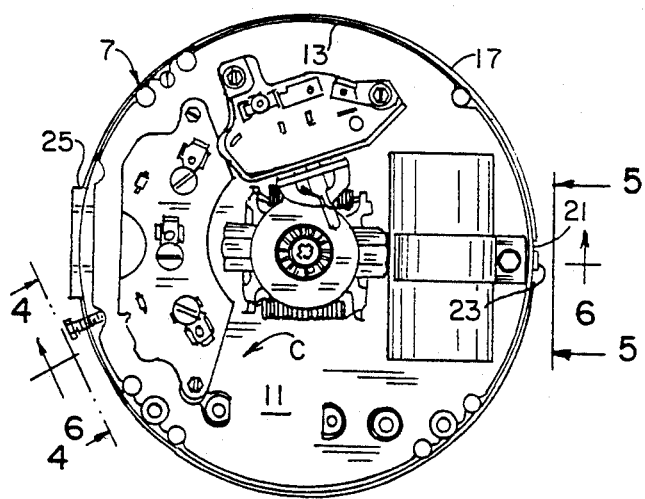
FIG. 2 is a top plan view of an endshield for the motor assembly.
Figure 4:
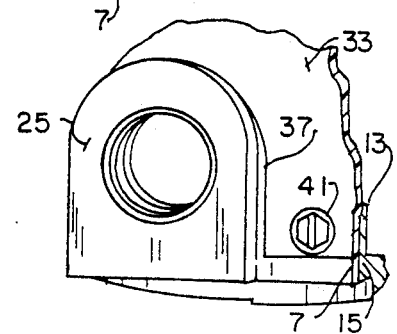
FIG. 4 is a perspective view taken along line 4—4 of FIG. 2 showing the endshield cover pivoted onto the endshield and ready for securement thereto.

Referring to the FIGURES, a motor M includes a cylindrical shell 1 housing a motor assembly MA having a shaft. Shell 1 is closed on a bottom or second end by a bottom or second endshield 3 and on its top or first end by an assembly 5. Assembly 5 includes a first or top endshield 7 and an endshield cover 9. "Top" and "bottom" are referenced to FIGS. 2, 3, and 6. The motor assembly shaft is rotatably supported in the first and second endshields 7 and 3.

Top endshield 7 has a base 11 on which a control circuit C is mounted, for controlling a motor, as is known. A circumferential wall 13 extends upwardly from base 11. Wall 13 is stepped, as at 15, to define a substantially circumferential shoulder 17. A gap 21 is formed in shoulder 17, and, above gap 21, a projection 23 extends outwardly from wall 13. Projection 23 is smaller in length than gap 21 and is centered with respect to gap 21.

Wall 13 is raised, as at 25, in a generally arc shaped extension, at a point opposite gap 21 and projection 23. A threaded opening in formed in wall portion 25, though which wires extend to connect control circuit C to a source of energy. Wall portion 25 is reinforced and extends outwardly beyond shoulder 7. A threaded opening 27 is formed in wall 13 off to one side of wall portion 25.

End shield cover 9 includes a top 31 and a circumferentially, downwardly extending wall 33. Wall 33 is sized and shaped to fit over endshield wall 13. It has an outer diameter approximately equal to that of endshield shoulder 17. A hole 35 is formed near the bottom of wall 33 and is sized and shaped to fit over projection 23. An arch 37 is formed in wall 33 opposite of hole 35 to fit over endshield wall portion 25. A screw hole 39 is formed in wall 33 offset from arch 37 to be in alignment with threaded opening 27 when the cover is placed on endshield 7.

Figure 5:
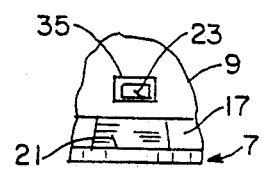
FIG. 5 is a perspective view taken along line 5—5 of FIG. 2.
Figure 3:
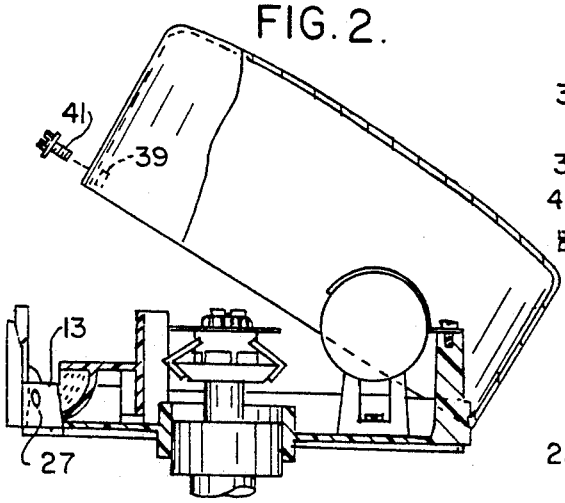
FIG. 3 is a perspective view of a first step of placing the endshield cover on the endshield.
Figure 6:
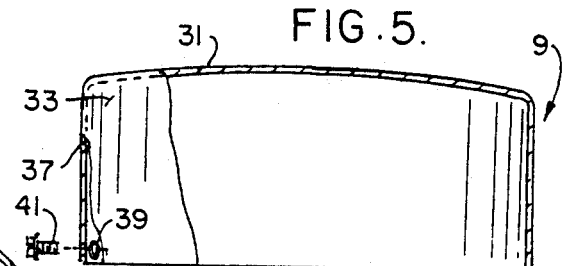
FIG. 6 is an exploded cross-sectional view of the endshield/endshield cover assembly taken along line 6—6 of FIG. 2.

To secure cover 9 to endshield 7, cover 9 is positioned initially on shoulder 17 to place cover opening 35 over wall projection 23, as is shown in FIGS. 3, 5 and 6. The cover is then pivoted downwardly to rest on shoulder 17. Arch 37 fits over wall portion 25. The cover is then secured in place by a single screw 41 which is passed through cover screw hole 39 and is screwed into threaded hole 27 of endshield wall 13.

This construction provides an assembly which is easy to assemble and disassemble in the field. Generally, screw 41 will be in an easily accessible location. To remove cover 9, screw 41 is removed, and cover 9 is pivoted upwardly from the point at which the screw holes are located. When the front of cover 9 clears wall 13 and the components of the control circuit, cover 9 can be pushed back to free it from projection or protrusion 23 and then fully removed to expose circuit C to service the circuit or the motor. The cover is also easy to replace. Cover 9 is placed over endshield 7 to rest on shoulder 17. It is then rotated till cover hole 35 engages projection 23. Cover 9 is then pivoted downwardly into position and screw 41 is replaced to secure cover 9 to endshield 7.

Numerous variations within the scope of the appended claims will be apparent to those skilled in the art in light of the foregoing description and accompanying drawings. For example, screw 41 and its associated screw holes could be located at any desired position on assembly 5, as long as screw 41 is easily accessible when the motor is mounted in the field. As indicated, "top" and "bottom" are relative terms, and depend on the motor position when it is installed or in use.

We claim:

1. A motor including a housing; a motor assembly in said housing; a first endshield to close one end of said housing; a second endshield to close another end of said housing; a control circuit mounted outwardly of said first endshield; and an endshield cover to enclose said control circuit, said endshield cover being removably mounted on said first endshield;
   said first endshield having a base, a circumfrential wall extending upwardly from said base, and a protrusion extending radially outwardly from said wall; and
   said endshield cover being sized to mate with said first endshield and having a top and a circumferential wall extending downwardly from said top, said wall defining an opening at a bottom thereof sized and shaped to fit over said endshield protrusion;
   said endshield cover being secured to said first endshield by a single fastener.

2. The motor assembly of claim 1 wherein said first end shield's circumferential wall define an external shoulder, said cover being sized to sit on said shoulder.

3. The motor assembly of claim 2 wherein said first end shield's circumferential wall defines a screw hole opposite from said protrusion, said endshield cover wall defining an opening in axial alignment with said endshield screw hole when said cover is in position on said endshield, said fastener being a screw which extends through said cover and said endshield.

4. An assembly having an endshield and an endshield cover for a motor, said endshield cover being removably secured to said endshield,
   said endshield having a base, a circumferential wall extending upwardly from said base, and a protrusion extending radially outwardly from said wall; and
   said endshield cover being sized to fit over said endshield and having a top and a circumferential wall extending downwardly from said top, said wall defining an opening at a bottom thereof sized and shaped to fit over said endshield protrusion;
   said endshield cover being secured to said endshield by a single fastener.

5. The assembly of claim 4 wherein said endshield wall defines an external shoulder, said cover being sized to sit on said shoulder.

6. The assembly of claim 5 wherein said endshield wall defines a screw hole opposite from said protrusion, said endshield cover wall defining an opening in axial alignment with said screw hole of said endshield wall when said cover is in position on said endshield, said fastener being a screw which extends through said cover and said endshield.

7. An assembly having an endshield and an endshield cover for a motor, said endshield cover being removably secured to said endshield,
   said endshield having a base and a circumferential wall extending upwardly from said base; and
   said endshield cover being sized to mate with said endshield and having a top and a circumferential wall extending downwardly from said top, said circumferential wall of said endshield cover being sized and shaped to fit with said endshield wall;
   said endshield and endshield cover having interacting means for positioning said endshield cover on said endshield including an outwardly extending projection;
   said endshield cover being secured to said endshield by a single fastener and only one fastener.

8. The assembly of claim 7 wherein said endshield wall defines a screw hole, said endshield cover wall defining an opening in axial alignment with said endshield screw hole when said cover is in position on said windshield, said fastener being a screw which extends through said cover and said endshield.

9. The assembly of claim 8 wherein said interacting means comprises an opening formed in said circumferential wall sized and shaped to receive said projection.

10. An assembly having an endshield and an endshield cover for a motor, said endshield cover being removably secured to said endshield,
    said endshield having a base, a circumferential wall extending upwardly from said base, and a protrusion extending radially outwardly from said wall; and
    said endshield cover being sized to fit over said endshield and having a top and a circumferential wall extending downwardly from said top, said endshield cover wall defining an opening at a bottom thereof sized and shaped to fit over said endshield protrusion;
    said endshield cover being secured to said endshield by a single fastener and only one fastener.

11. The assembly of claim 10 wherein said endshield wall defines an external shoulder, said cover being sized to sit on said shoulder.

12. The assembly of claim 11, said shoulder defining a gap, said protrusion being centered with respect to said shoulder gap.

13. The assembly of claim 12, wherein said shoulder is shorter than said endshield wall, said protrusion being positioned above said gap.

14. In a motor including a shell, a motor assembly having a shaft, said motor assembly being mounted within said shell, a first end shield at least partially closing one end of said shell, a second endshield at least partially closing another end of said shell, said first and said second endshields rotatably supporting said shaft, a control circuit mounted outwardly of one of said first and said second end shields, and an endshield cover adapted to enclose said control circuit and to mate with said one endshield; the improvement comprising means for removably mounting said cover to said one endshield, said mounting means including a protrusion extending radially outwardly from said one endshield, means for receiving said protrusion formed in said endshield cover for positioning said endshield cover on said one endshield, fastener receiving means formed in said one endshield approximately opposite said protrusion, fastener receiving means formed in said endshield cover approximately opposite said protrusion receiving means of said endshield cover and aligned with the fastener receiving means formed in said one endshield, and at least one fastener positioned along the fastener receiving means of said one endshield cover and said one endshield for locking said endshield cover to said one endshield.

* * * * *

UNITED STATES PATENT AND TRADEMARK OFFICE
CERTIFICATE OF CORRECTION

PATENT NO.   :   5,278,469
DATED        :   January 11, 1994
INVENTOR(S)  :   Bruce Weber, et al It is certified that error appears in the above-indentified patent and that said Letters Patent is hereby corrected as shown below:

Column 3, Line 43  delete "define" and insert -- defines --
Column 4, Line 27  delete "windshield" and insert -- endshield --

Signed and Sealed this

Fifteenth Day of November, 1994

Attest:

BRUCE LEHMAN

Attesting Officer      Commissioner of Patents and Trademarks